United States Patent [19]
Piacente et al.

[11] Patent Number: 5,700,088
[45] Date of Patent: Dec. 23, 1997

[54] AMMUNITION PROPELLANT TEMPERATURE MEASURING ASSEMBLY

[75] Inventors: Robert A. Piacente, Schenetady; Karol Anne Liu Madulka, Ballston Spa; John M. Kenna, Rensselaer, all of N.Y.

[73] Assignee: The United States of America as represented by the Secretary of the Army, Washington, D.C.

[21] Appl. No.: 540,605

[22] Filed: Oct. 6, 1995

[51] Int. Cl.⁶ .................. G01K 1/16; G01K 13/00; G01J 5/00; F41A 31/00
[52] U.S. Cl. .................. 374/141; 73/167; 102/481; 42/1.01; 364/557
[58] Field of Search .................. 374/126, 128, 374/141, 142; 73/167; 42/1.01; 102/481; 364/557

[56] References Cited

U.S. PATENT DOCUMENTS

| | | | |
|---|---|---|---|
| 3,575,085 | 4/1971 | McAdam, Jr. | 89/41.01 |
| 3,902,368 | 9/1975 | Hasenbein et al. | 73/167 |
| 3,956,966 | 5/1976 | French | 374/178 |
| 5,024,136 | 6/1991 | Bock | 89/6 |
| 5,282,017 | 1/1994 | Kasindorf et al. | 374/126 |
| 5,326,172 | 7/1994 | Ng | 374/126 |
| 5,326,173 | 7/1994 | Evans et al. | 374/126 |
| 5,624,189 | 4/1997 | Vottis et al. | 374/141 |

*Primary Examiner*—Diego F. F. Gutierrez
*Attorney, Agent, or Firm*—Michael C. Sachs

[57] ABSTRACT

An ammunition propellant temperature measuring assembly comprising a first temperature measuring device for determining at least two surface temperatures of a round of ammunition and for transmitting a first signal indicative of the surface temperature, a second temperature measuring device for determining ambient temperature in a storage area for the ammunition and for transmitting a second signal indicative of the ambient temperature, and computer apparatus for receiving the first and second signals and a temperature profile for the ammunition, and adapted to compute therefrom a propellant temperature of the round.

10 Claims, 1 Drawing Sheet

5,700,088

AMMUNITION PROPELLANT TEMPERATURE MEASURING ASSEMBLY

STATEMENT OF GOVERNMENT INTEREST

The invention described herein may be manufactured, used and licensed by or for the Government for Governmental purposes.

BACKGROUND OF THE INVENTION

1. Field of the Invention

The invention relates to the measurement of temperature of ammunition, and is directed more particularly to the measurement of ammunition propellant temperature on a round to round basis.

2. Description of the Prior Art

In the gun fire systems of tanks and other armored vehicles, it has been known that the temperature of a round of ammunition plays a role in gun firing accuracy.

It is common in such vehicles to provide a temperature gage in the ammunition storage compartment of the vehicle to measure the air temperature in the compartment. Once measured, the air temperature is manually entered into a ballistic computer. Such a system requires that the rounds be stabilized to the ambient temperature in the storage compartment which, in turn, sometimes requires that old rounds be fired before newly stored rounds.

It has recently become known that the propellant temperature of a round has a significant bearing on gun firing accuracy. Under the prior art system, there is no means by which to measure propellant temperature of a single round at any given time, particularly while the round is being loaded into a gun.

Accordingly, there is a need, in a gun fire control system, for an ammunition propellant temperature measuring means which has the capability of determining the propellant temperature of individual rounds as they are loaded into the breach of an associated gun.

SUMMARY OF THE INVENTION

It therefore is an object of the invention to provide an assembly for measuring the propellant temperature of ammunition.

A further object of the invention is to provide such an assembly for effecting such measurements on a round by round basis.

A still further object of the invention is to provide such an assembly as is capable of effecting such measurements on a given round during the loading of that round into the breech of an associated gun.

With the above and other objects in view, as will hereinafter appear, a feature of the invention is the provision of an ammunition propellant temperature measuring assembly comprising a first temperature measuring device for determining at least two surface temperatures of a round of ammunition and for transmitting a first signal indicative of the surface temperatures, a second temperature measuring device for determining ambient temperature in a storage area for the ammunition and for transmitting a second signal indicative of the ambient temperature, and computer means for receiving the first and second signals and a temperature profile for the ammunition, and adapted to compute therefrom the propellant temperature of the round.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
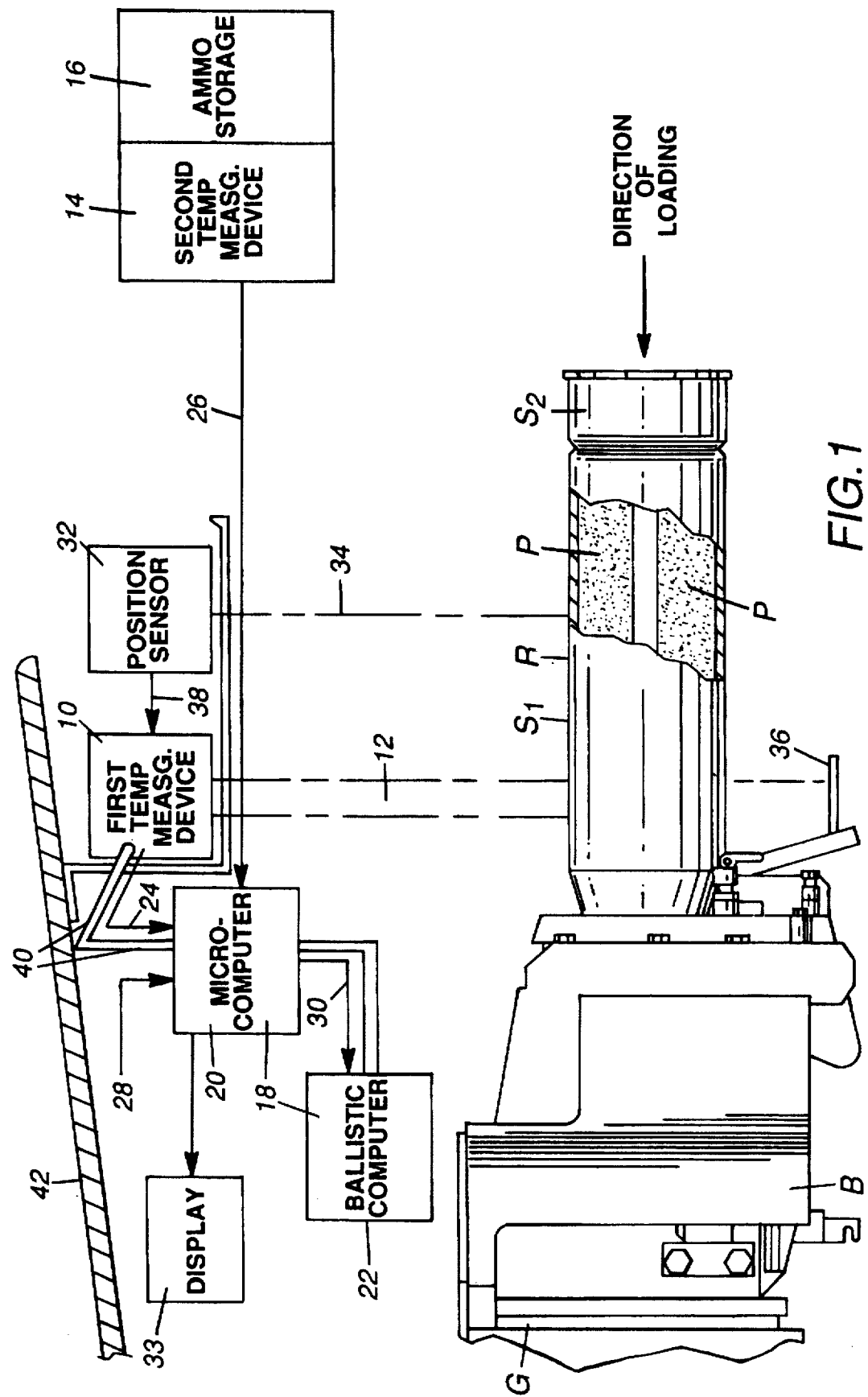
FIG. 1 is diagrammatic illustration of one form of measuring assembly illustrative of an embodiment of the invention.

Referring to FIG. 1, it will be seen that the illustrative assembly is associated with a breech B of a gun G and is adapted to act upon a round R of ammunition having surfaces $S_1$ and $S_2$, and in which there is disposed a propellant P. Prior to firing, the round R is loaded into the breech B.

The inventive assembly includes a first temperature measuring device 10 which projects an infrared sensing beam 12 for measurement of the surface temperature of the round R just prior to the entry of the round R into the breech B. The first temperature measuring device 10 preferably is an infrared transducer, known in the art. One such transducer found acceptable is known as the Series 3000 transducer, produced by Everest Interscience, Inc. The operation of the first temperature measuring device 10 is based upon the fact that the round surfaces $S_1$ and $S_2$ emit infrared energy, as do all surfaces. The wavelengths of the emitted energy relate to the temperatures $T_{S1}$ and $T_{S2}$ of the surfaces $S_1$ and $S_2$ respectively. The surfaces $S_1$ and $S_2$ of the round R also reflect infrared radiation emitted by surrounding surfaces. The infrared temperature measuring device, that is, the first temperature measuring device 10, is able to receive a portion of the infrared radiation emitted and reflected by the surface $S_1$ and $S_2$ of the round R and, from it, generate at least two corresponding surface temperatures $T_{S1}$ and $T_{S2}$. With respect to the specific examples illustrated by equations 1 through 4, the first surface temperature $T_{S1}$ refers to a cartridge case temperature Tc; and the second temperature $T_{S2}$ refers to a stub case temperature Ts. With respect to the specific examples illustrated by equations 5 through 8, the first surface temperature $T_{S1}$ refers to a cartridge case temperature Tc; and the second temperature $T_{S2}$ refers to an average warhead (projectile) surface temperature Tw.

The assembly herein further includes a second temperature measuring device 14 disposed in an ammunition storage compartment 16 from whence are taken the rounds for the gun G.

A computer means 18, which may include a microcomputer 20 and a ballistic computer 22, is provided. If the computer means 18 includes the microcomputer 20 and the ballistic computer 22, the microcomputer 20 is adapted to receive signals from the first and second temperature measurement devices 10, 14.

The first temperature measuring device 10 is adapted to transmit a first signal 24 indicative of the measured surface temperatures of the round to the microcomputer 20. Similarly, the second temperature measuring device 14 is adapted to transmit a second signal 26 indicative of the ambient temperature $T_A$ in the ammunition storage compartment 16, to the microcomputer 20.

As noted above, the microcomputer 20 is adapted to receive the signals 24, 26 from the first and second temperature measuring devices. The microcomputer 20 is further adapted to receive and retain a temperature profile 28, which may be entered into the microcomputer 20 manually or by automatic means. The microcomputer 20 is adapted to compute from the first and second temperature signals 24, 26 and from the temperature profile 28, the temperature of the propellant P in the particular round R entering the breech B, and to transmit a signal 30 to the ballistic computer 22, the signal being indicative of the computed temperature of the propellant. The ballistic computer is then able to refine the expected trajectory of the round, and thereby enhance accuracy of the round upon firing.

Mounted proximate the first temperature sensing device 10 is a position sensor 32 which projects a beam 34 of energy, such as a light beam, onto a reflector 36 which reflects the beam 34 back to the sensor 32. The energy beam 34 may, alternatively, be an infrared beam. If so, the beam comprises infrared wavelengths significantly different from those associated with the first temperature sensor 10, so as not to interfere with the first temperature sensor. Upon interruption of the beam 34 by movement of the round R toward the breech B, the sensor, after a slight delay, usually of about one-half second, sends a wake-up call 38 to the first temperature measuring device 10 to activate the device 10. The wake-up call 38 is delayed so as not to activate the first temperature measuring device 10 upon momentary interruption of the energy beam 34, as by movement of an operator's hand therethrough.

When the above-described assembly is used in a tank, or similar vehicle, the position sensor 22, first temperature sensor 10, and computer means 18 may be supported by brackets 40 fixed to a gun turret top portion 42, or other relatively stable structural element.

It is to be understood that the present invention is by no means limited to the particular assembly herein disclosed and/or shown in the drawings, but also comprises any modifications or equivalents within the scope of the claims. For example, the computer means 18 may comprise a single ballistic computer with capability of performing the tasks above assigned to the microcomputer. When two computers are used, as described above, the microcomputer may, rather than sending the signal 30 to the ballistic computer, simply display the propellant temperature which may then be entered manually into the ballistic computer. The propellant temperature may be displayed on a display 33. The second temperature measuring device 14 may be electrical or mechanical. If electrical, it is contemplated that the device 14 will send the signal 26 directly to the microcomputer 20, as described above and as illustrated in FIG. 1. However, if the second temperature measuring device is mechanical, the storage compartment ambient temperature may be displayed and manually input into the microcomputer.

Further, though mention is made above of the utility of the assembly in tank and armored vehicle environments, it will be apparent that the assembly described herein is applicable to any gun operated by a computerized fire control system, such as fixed emplacements, naval gun turrets, and the like.

There is thus provided an ammunition propellant temperature measuring assembly which effects measurement of the propellant temperature of an individual round of ammunition at the last moment before the round enters the breech of the gun.

Attached are formulas or equations for the Algorithm to convert surface temperatures to propellant temperatures for various rounds of ammunition. These formulas or equations correspond to the temperature profile of the ammunition and are indicative of a relationship between the first temperature signal 24 (representative of the measured two surface temperatures of the round R), the second temperature 26 (representative of the ambient temperature in the ammunition storage compartment 16), and the temperature of the propellant P.

ALGORITHM TO CALCULATE PROPELLANT TEMPERATURES
M829A1 ROUNDS (EQUATION 1)

$$T_P = \begin{cases} T_A \\ \text{IF } T_C = T_A \text{ OR } T_S = T_A \\ \\ T_A + 1.90463(T_C - T_A)\left|\dfrac{T_C - T_A}{T_S - T_A}\right|^{.257625} \\ \\ \text{IF } T_C \neq T_A \text{ AND } T_S \neq T_A \end{cases}$$

WHERE:

$T_P$ IS THE AVERAGE PROPELLANT TEMPERATURE
$T_{S1} = T_C$ IS THE CARTRIDGE CASE TEMPERATURE
$T_{S2} = T_S$ IS THE STUB CASE TEMPERATURE
$T_A$ IS THE AMBIENT TEMPERATURE
RESIDUAL STANDARD DEVIATION: 3.18

ALGORITHM TO CALCULATE PROPELLANT TEMPERATURES
M829 ROUNDS (EQUATION 2)

$$T_P = \begin{cases} T_A \\ \text{IF } T_C = T_A \text{ OR } T_S = T_A \\ \\ T_A + 2.03659(T_C - T_A)\left|\dfrac{T_C - T_A}{T_S - T_A}\right|^{.0777432} \\ \\ \text{IF } T_C \neq T_A \text{ AND } T_S \neq T_A \end{cases}$$

WHERE:

$T_P$ IS THE AVERAGE PROPELLANT TEMPERATURE
$T_{S1} = T_C$ IS THE CARTRIDGE CASE TEMPERATURE
$T_{S2} = T_S$ IS THE STUB CASE TEMPERATURE
$T_A$ IS THE AMBIENT TEMPERATURE
RESIDUAL STANDARD DEVIATION: 3.35

ALGORITHM TO CALCULATE PROPELLANT TEMPERATURES
M865 ROUNDS (EQUATION 3)

$$T_P = \begin{cases} T_A \\ \text{IF } T_C = T_A \text{ OR } T_S = T_A \\ \\ T_A + 2.15190(T_C - T_A)\left|\dfrac{T_C - T_A}{T_S - T_A}\right|^{-.0356577} \\ \\ \text{IF } T_C \neq T_A \text{ AND } T_S \neq T_A \end{cases}$$

WHERE:

$T_P$ IS THE AVERAGE PROPELLANT TEMPERATURE
$T_{S1} = T_C$ IS THE CARTRIDGE CASE TEMPERATURE
$T_{S2} = T_S$ IS THE STUB CASE TEMPERATURE
$T_A$ IS THE AMBIENT TEMPERATURE
RESIDUAL STANDARD DEVIATION: 3.89

ALGORITHM TO CALCULATE PROPELLANT TEMPERATURES
M831 ROUNDS (EQUATION 4)

$$T_P = \begin{cases} T_A \\ \text{IF } T_C = T_A \text{ OR } T_S = T_A \\ \\ T_A + 1.90099(T_C - T_A)\left|\dfrac{T_C - T_A}{T_S - T_A}\right|^{-.0232289} \\ \\ \text{IF } T_C \neq T_A \text{ AND } T_S \neq T_A \end{cases}$$

WHERE:

$T_P$ IS THE AVERAGE PROPELLANT TEMPERATURE
$T_{S1} = T_C$ IS THE CARTRIDGE CASE TEMPERATURE
$T_{S2} = T_S$ IS THE STUB CASE TEMPERATURE
$T_A$ IS THE AMBIENT TEMPERATURE
RESIDUAL STANDARD DEVIATION: 3.63

---

TANK AMMO THERMAL TEST
$T_P$ IS THE AVERAGE PROPELLANT TEMPERATURE
$T_C$ IS THE CARTRIDGE CASE TEMPERATURE
(SURFACE TEMPERATURE $T_{S1}$)
$T_W$ IS THE AVERAGE WARHEAD(PROJECTED)
TEMPERATURE(SURFACE TEMPERATURE $T_{S2}$)
$T_A$ IS THE AMBIENT AIR TEMPERATURE
M829A1 ROUNDS(EQUATION 5)

$$T_P = \begin{cases} T_A, \text{ if } T_C = T_A \text{ or } T_W = T_A \\ \\ T_A + 2.264(T_C - T_A)\left|\dfrac{T_C - T_A}{T_W - T_A}\right|^{-0.4686} \\ \\ \text{if } T_C \neq T_A \text{ and } T_W \neq T_A \end{cases}$$

---

M829 ROUNDS(EQUATION 6)

$$T_P = \begin{cases} T_A, \text{ if } T_C = T_A \text{ or } T_W = T_A \\ \\ T_A + 3.015(T_C - T_A)\left|\dfrac{T_C - T_A}{T_W - T_A}\right|^{0.3243} \\ \\ \text{if } T_C \neq T_A \text{ and } T_W \neq T_A \end{cases}$$

---

M865 ROUNDS(EQUATION 7)

$$T_P = \begin{cases} T_A, \text{ if } T_C = T_A \text{ or } T_W = T_A \\ \\ T_A + 2.162(T_C - T_A)\left|\dfrac{T_C - T_A}{T_W - T_A}\right|^{-0.3127} \\ \\ \text{if } T_C \neq T_A \text{ and } T_W \neq T_A \end{cases}$$

---

M831 ROUNDS(EQUATION 8)

$$T_P = \begin{cases} T_A, \text{ if } T_C = T_A \text{ or } T_W = T_A \\ \\ T_A + 2.095(T_C - T_A)\left|\dfrac{T_C - T_A}{T_W - T_A}\right|^{0.0151} \\ \\ \text{if } T_C \neq T_A \text{ and } T_W \neq T_A \end{cases}$$

What is claimed is:

1. An ammunition propellant temperature measuring assembly comprising:

a first temperature measuring device for determining at least two surface temperatures of a round of ammunition and for transmitting a first signal indicative of said at least two surface temperatures;

a second temperature measuring device for determining ambient temperature in a storage area for said round of ammunition and for providing a second signal indicitive of said ambient temperature; and a computer for receiving said first signal, said second signal, and an input as to a temperature profile for said round of ammunition corresponding to a relationship between said at least two surface temperatures, said ambient temperature, and the propellant temperature, to compute therefrom the propellant temperature of said round.

2. The assembly in accordance with claim 1 wherein said assembly includes a display of said indication of said ambient temperature and said computer manually receives said second signal.

3. The assembly in accordance with claim 1 further comprising a position sensor disposed proximate said first temperature measuring device for detecting movement of said round toward a gun breech and to signal said first temperature measuring device to begin a temperature measuring operation.

4. An ammunition propellant temperature measuring assembly comprising:

a first temperature measuring device for determining at least two surface temperatures of a round of ammunition and for transmitting a first signal indicative of said at least two surface temperatures;

a second temperature measuring device for determining ambient temperature in a storage area for said round of ammunition and for transmitting a second signal indicative of said ambient temperature; and a computer for receiving said first and second signal and a temperature profile for said round of ammunition corresponding to a relationship between said at least two surface temperatures, said ambient temperature, and the propellant temperature, for computing therefrom the propellant temperature of said round.

5. The assembly in accordance with claim 4 wherein said first temperature measuring device comprises an infrared transducer.

6. The assembly in accordance with claim 5 for use with a gun that fires said round, wherein said computer comprises a first computer for computing said propellant temperature, and a ballistic computer, said first computer transmitting a signal indicative of said propellant temperature to said ballistic computer, and said ballistic computer receiving said signal indicative of said propellant temperature to refine an expected trajectory of said round.

7. The assembly in accordance with claim 4 and further comprising a position sensor disposed proximate said first temperature measuring device for detecting movement of said round toward a gun breech and to signal said first temperature measuring device to begin a temperature measuring operation.

8. The assembly in accordance with claim 7 wherein said position sensor emits a beam of energy, and said assembly includes a reflector in position to receive said beam and reflect said beam at least in part back to said sensor, said position sensor and said reflector being on opposite sides of said breech, such that said round in moving toward said breech interrupts said beam.

9. The assembly in accordance with claim 8 wherein said position sensor delays said signal to said first temperature measuring device for a selected time after interruption of said beam.

10. An ammunition propellant temperature measuring assembly for use with a gun that fires a round of ammunition, comprising:

a first temperature measuring device disposed proximate a gun breech that receives ammunition, said first temperature measuring device determining at least two surface temperatures of the round of ammunition entering said breech and transmitting a first signal indicative of said at least two surface temperatures;

a second temperature measuring device disposed in a storage area for said round of ammunition for determining an ambient temperature in said storage area and for transmitting a second signal indicative of said determined storage area ambient temperature;

a first computer for receiving said first signal, said second signal, and a temperature profile for said round of ammunition corresponding to a relationship between said at least two surface temperatures, said ambient temperature, and the propellant temperature, and computing therefrom the propellant temperature of the round of ammunition, said first computer transmitting a signal indicative of said computed propellant temperature;

a ballistic computer receiving said signal indicative of said computed propellant temperature from said first computer to refine an expected trajectory of the round of ammunition upon firing from the gun;

a position sensor disposed proximate said first temperature measuring device for detecting movement of the round toward said breech and to signal said first temperature measuring device to begin a temperature measuring operation; and a reflector mounted proximate said gun breech on an opposite side thereof from said position sensor and in alignment with said position sensor to receive and reflect an energy beam from said position sensor, said signal from said position sensor to said first temperature measuring device being triggered by interruption of said beam by the round of ammunition moving toward said breech.

* * * * *